US012619125B2

(12) United States Patent
Vasilyev et al.

(10) Patent No.: US 12,619,125 B2
(45) Date of Patent: May 5, 2026

(54) LOW-THRESHOLD SUPERCONTINUUM GENERATION IN BULK DIELECTRICS AND SEMICONDUCTORS

(71) Applicant: IPG PHOTONIC CORPORATION, Oxford, MA (US)

(72) Inventors: Sergey Vasilyev, Oxford, MA (US); Mike Mirov, Oxford, MA (US); Igor Moskalev, Oxford, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 192 days.

(21) Appl. No.: 18/260,020

(22) PCT Filed: Dec. 29, 2021

(86) PCT No.: PCT/US2021/065532

§ 371 (c)(1),
(2) Date: Jun. 29, 2023

(87) PCT Pub. No.: WO2022/147141

PCT Pub. Date: Jul. 7, 2022

(65) Prior Publication Data

US 2024/0103337 A1 Mar. 28, 2024

Related U.S. Application Data

(60) Provisional application No. 63/131,577, filed on Dec. 29, 2020.

(51) Int. Cl.
*G02F 1/35* (2006.01)
*G02F 1/355* (2006.01)

(52) U.S. Cl.
CPC .......... *G02F 1/3528* (2021.01); *G02F 1/3548* (2021.01); *G02F 1/3551* (2013.01); *G02F 2203/11* (2013.01)

(58) Field of Classification Search
CPC ..................................................... G02F 1/3528
See application file for complete search history.

(56) References Cited

U.S. PATENT DOCUMENTS 10,608,401 B2 * 3/2020 Vasilyev ............... H01S 3/1095
11,469,567 B2 * 10/2022 Fejer ........................ G02F 1/395
(Continued)

FOREIGN PATENT DOCUMENTS

KR 20180063109 A * 6/2018 ........... H01S 3/1001

OTHER PUBLICATIONS

J. Gu, S. Vasilyev, M. Mirov and M. Kolesik, "Modeling Harmonic and Supercontinuum Generation in Polycrystalline Materials," 2021 Conference on Lasers and Electro-Optics (CLEO), San Jose, CA, USA, 2021, pp. 1-2. (Year: 2021).*
(Continued)

*Primary Examiner* — Rhonda S Peace
(74) *Attorney, Agent, or Firm* — Yuri B. Kateshov, Esq.

(57) ABSTRACT

Controlling a low-threshold femtosecond supercontinuum (fs SCG) in a bulk nonlinear material (BNLM) with a positive thermo-optic coefficient (dn/dT>0 $K^{-1}$) is provided by coupling light at a first wavelength output by a fs oscillator at a full pulse repetition PRR into the BNLM. The coupling of light produces a nonlinear lens of the coupled beam in the BNLM which is insufficient to provide intensity of the light sufficient to reach ta threshold of the fs SCG. To raise the pulse energy and reach the SCG threshold, light at a second wavelength different from the first wavelength is absorbed in the BNLM to form a thermal lens in the BNLM which assist the nonlinear lens in creating the SCG.

20 Claims, 2 Drawing Sheets

(56) References Cited

U.S. PATENT DOCUMENTS

| | | | | |
|---|---|---|---|---|
| 2016/0062210 | A1* | 3/2016 | Moulton | G02B 6/122 385/122 |
| 2017/0018903 | A1* | 1/2017 | Vasilyev | H01S 3/1095 |
| 2024/0103337 | A1* | 3/2024 | Vasilyev | G02F 1/3548 |

OTHER PUBLICATIONS

S. Vasilye et al., "Long-wave IR femtosecond supercontinuum generation with Cr:ZnS lasers," 2020 IEEE Research and Applications of Photonics in Defense Conference (RAPID), Miramar Beach, FL, USA, 2020, pp. 1-2. (Year: 2020).*

S. Vasilyev, Jiahui Gu, Mike Mirov, Yury Barnakov, Igor Moskalev, Viktor Smolski, Jeremy Peppers, Miroslav Kolesik, Sergey Mirov, and Valentin Gapontsev, "Low-threshold supercontinuum generation in polycrystalline media," J. Opt. Soc. Am. B 38, 1625-1633 (2021). (Year: 2021).*

* cited by examiner

FIG. 1A
Known Art
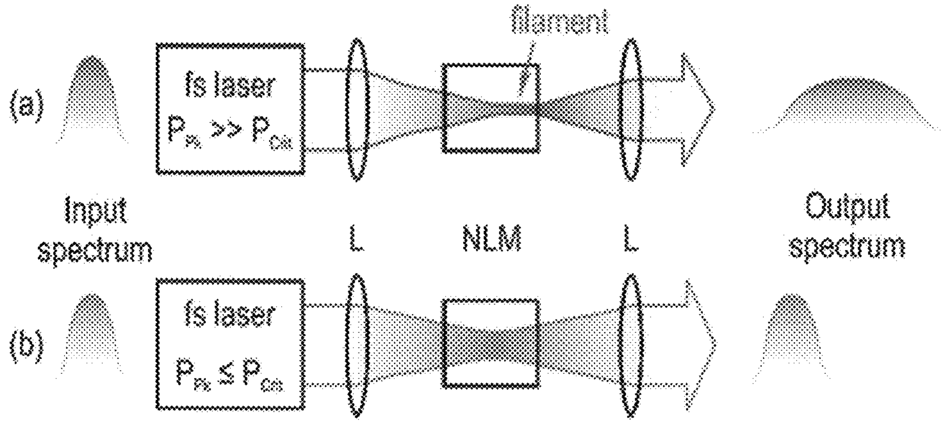
FIG. 1B
Known Art
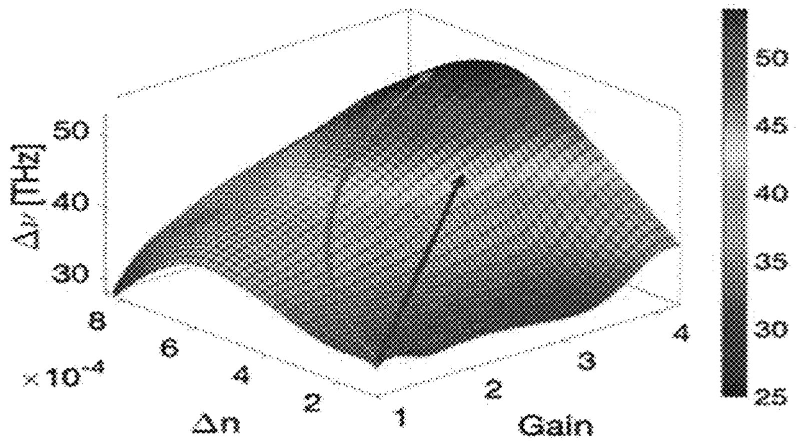
FIG. 3A
FIG. 2
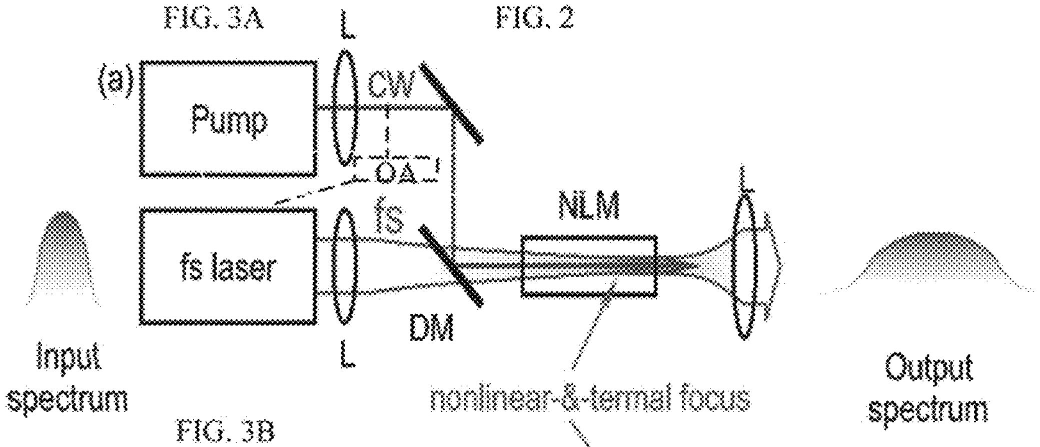
FIG. 3B
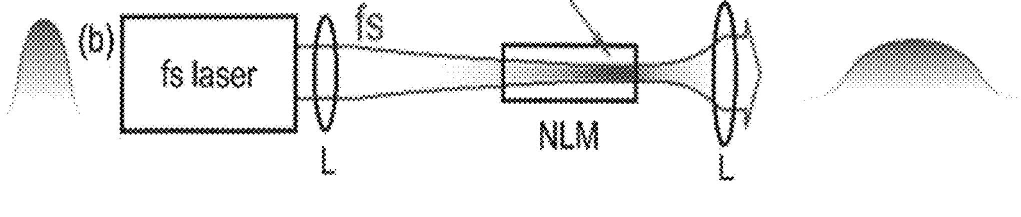

FIG. 4A
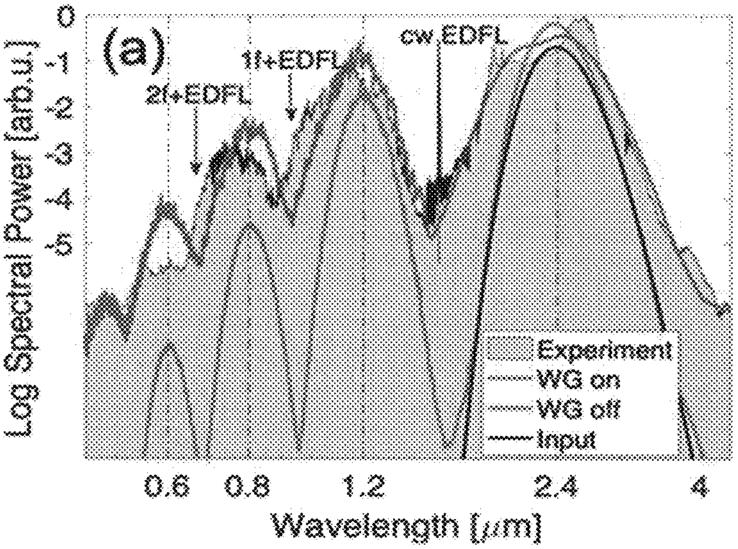
FIG. 4B
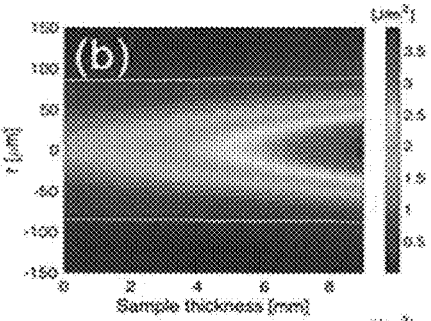
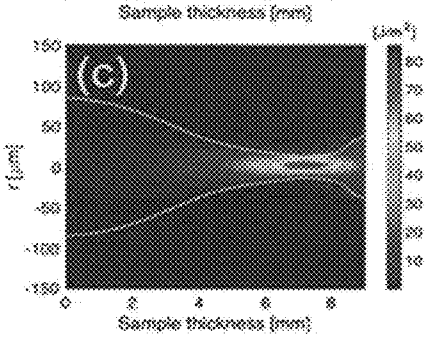
FIG. 4C
FIG. 5A
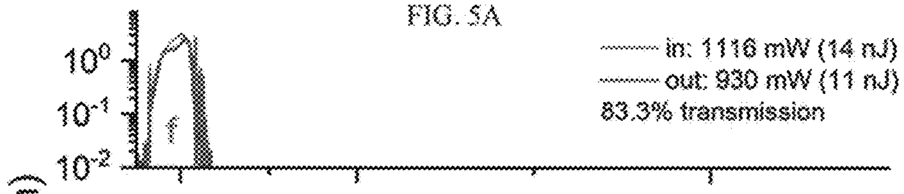
FIG. 5B
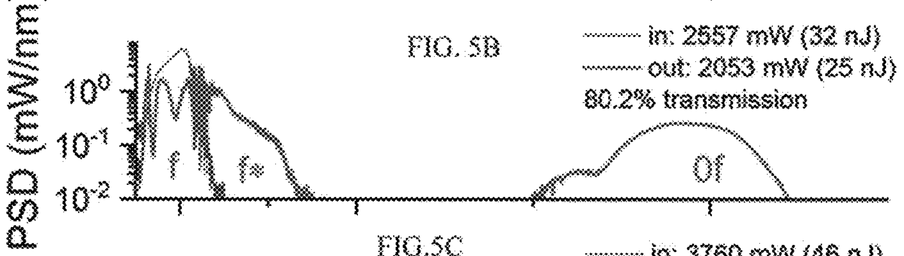
FIG.5C
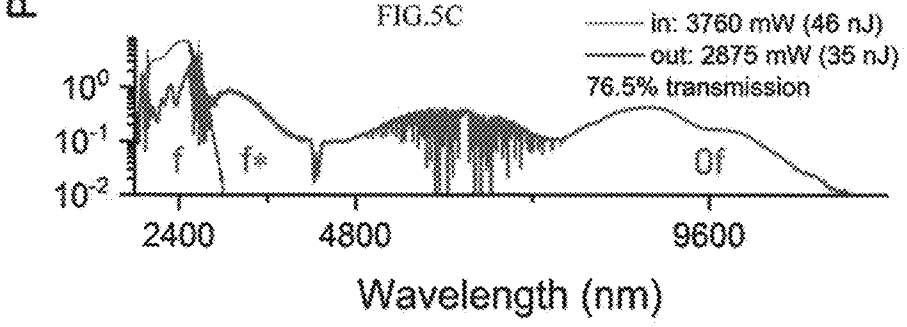
— in: 1116 mW (14 nJ)
— out: 930 mW (11 nJ)
83.3% transmission
— in: 2557 mW (32 nJ)
— out: 2053 mW (25 nJ)
80.2% transmission
— in: 3760 mW (46 nJ)
— out: 2875 mW (35 nJ)
76.5% transmission

LOW-THRESHOLD SUPERCONTINUUM GENERATION IN BULK DIELECTRICS AND SEMICONDUCTORS

This application is a 35 USC 371 national stage entry of PCT/US2021/065532, filed on Dec. 29, 2021, which claims the benefit of priority under 35 U.S.C. § 119 (e) to U.S. Provisional Application Ser. No. 63/131,577, titled LOW-THRESHOLD SUPERCONTINUUM GENERATION IN BULK DIELECTRICS AND SEMICONDUCTORS, filed on Dec. 29, 2020, all of which are hereby incorporated by reference in their entirety.

BACKGROUND OF DISCLOSURE

Filed of the Disclosure

This disclosure relates to methods of femtosecond supercontinuum generation (SCG) and supercontinuum laser sources. In particular, the disclosure relates to a method and system of generating low-threshold SCG in bulk dielectric and semiconductor nonlinear materials (NLM) by generating a thermal lens effect along with a nonlinear self-focusing effect.

Background of the Disclosure

The SCG is the formation of broad continuous spectra by propagation of high-power pulses through nonlinear media. The SCG with fs pulses (fs SCG) in particular attracts attention because it yields optical spectra that combine a broad, super-octave bandwidth with a high spatial and temporal coherence. Therefore, fs SCG is crucial for a number of important applications including, among others, the generation of optical frequency combs, arbitrary optical waveform synthesis and generation of attosecond pulses. The optical frequency combs, which is equivalent to fs pulse trains, with a Watt-level average power P between 0.1 and 10 W, relatively high pulse repetition rate (PRR) or frequency $f_R$ ranging between $10^7$-$10^{10}$ Hz and hence low pulse energy $W=P_{av}/f_R=0.1-100$ nJ are indispensable to spectroscopy, sensing, microscopy and imaging.

The techniques for fs SCG in specifically designed optical nonlinear fibers and waveguides, such as a silicon nitride (Si3N4), are well established. However, the use of the fibers and waveguides characterized by confined geometry comes at the expense of an increased complexity and reduced overall efficiency of the laser system. Further, the nonlinear fibers and waveguides have intrinsic limitations on power and coherence of SCG and require precise alignment.

Bulk materials, including, for example, transparent amorphous solids (e.g. silicate and non-silicate optical glasses), crystals (e.g. oxides, fluorides, phosphides) and semiconductors (silicon, germanium, and other III-V and II-VI materials) also support fs SCG. The advantages of fs SCG in these materials include, among others, relative simplicity and thus low cost, flexibility, and possibility to scale peak and average power. In these materials laser propagation is not restricted by the material cross section profile which allows for relaxed alignment sensitivity. Moreover, SCG in some bulk materials features compression of femtosecond input pulse to even shorter output pulse comprising only few optical cycles. For example, USPP 2021/0124236 and U.S. Pat. Nos. 10,216,063 10,216,063 and 10,483,709, which are all co-owned with the subject matter application and incorporated herein by reference in their entirety, all teach SCG in a random quasi-phase-matched gain medium such as a polycrystalline zinc sulfide doped with $Cr^{2+}$ ions.

Femtosecond SCG in nonlinear media is governed by interplays between nonlinearities of the selected bulk material, nonlinear absorption and chromatic dispersion. The physical picture of fs-SCG could be understood in the framework of filamentation: the interplay between self-focusing, self-phase modulation, multiphoton absorption/ionization-induced free electron plasma. The interaction among these physical phenomena leads to the appearance of a filament "a dynamic structure with an intense core, that is able to propagate over extended distances much larger than the typical diffraction length while keeping a narrow beam size without the help of any external guiding mechanism" (A. Couairon and A. Mysyrowicz, Femtosecond filamentation in transparent media, Phys. Rep. 441, 47-190 (2007).) An important consequence of the filament formation is very strong nonlinear broadening of the pulse spectrum, i.e., bandwidth of the output spectrum is much larger than that of the input spectrum. FIGS. 1A and 1B illustrate a standard set-up for fs SCG in bulk materials. The presence of filamentation in FIG. 1A results in strong broadening, but if it is absent, as shown in FIG. 1B, the output spectrum is not broadened.

The initial stage of filament formation is governed by self-focusing: $\chi^{(3)}$ nonlinearity of the medium induces the intensity-dependent refractive index: $n(I)=n_0+n_2I$, where I is the intensity, $n_0$ is the linear refractive index, $n_2$ is the nonlinear refractive index. The local intensity is higher at the center of the beam and lower at its edges. Therefore bulk $\chi^{(3)}$ medium with $n_2>0$ acts like an intensity-dependent lens. The self-focusing threshold is defined by the critical power $P_{Crit}$, which, in turn, is defined by the parameters of the gain medium including the refractive index's nonlinear and linear components and wavelength coupled into the medium. The values of $P_{Crit}$ in the gain medium—bulk dielectrics and semiconductors, further referred to as nonlinear material or medium (NLM)) are in the range from 0.1 MW to tens of MW depending on the material.

The fs-SCG in bulk gain media occurs if the peak power of input pulses ($P_{Pk}$) significantly exceeds $P_{Crit}$ (usually by an order of magnitude and more). Thus, based on the foregoing, the standard implementation of the fs-SCG in gain NLM are based on the fs lasers with relatively high, multi-MW-level peak power (up to 100 MW) and respectively high μJ-level pulse energy that typically operate at low kHz repetition rates.

However, many important applications of the fs-SCG, including optical frequency comb generation, require fs lasers that operate at high multi-MHz rate, i.e. at a full repetition rate of mode-locked oscillator $f_R=10^7$-$10^{10}$ Hz and low nJ-level pulse energy. The peak power level of nJ fs pulses usually at sub-MW to less than 10 MWs (i.e. $P_{Pk}\leq P_{Crit}$) which is too weak to cause the self-focusing in the NLM. Hence, SCG and spectral broadening are either too weak or simply do not occur. This regime is illustrated in FIG. 1B.

The experimental data associated with fs SCG in a bulk NLM raise a number of questions about the propagation of few-cycle pulses in bulk NLM. The fs oscillator's operation at the full PRR does not allow fs pulses to reach the desired peak power sufficient to create the fs SCG. The schematics of the acknowledged prior art could not reach the fs SCG at the existing PRRs. Therefore some additional mechanisms assisting the nonlinear focusing to induce fs SCG at high PRRs should be identified. Knowing these mechanisms and controlling them will provide a universal methodology of the low-threshold fs SCG in NLMs of interest despite operating the fs oscillator at the full PRR, which as mentioned is high, and a relatively.

A need, therefore, exists for utilizing known physical processes to provide the improved method of achieving low threshold fs-SCG at nJ-level pulse energy ($P_{Pk} \leq P_{Crit}$) and at high multi-MHz pulse repetition rates in NLMs of interest.

Another need exists for laser systems configured to carry the improved processes.

SUMMARY OF THE DISCLOSURE

The inventive concept is based on a cumulative effect produced by the nonlinear self-focusing effect and disclosed here thermal lens which is formed in the NLMs of interest as a result of interaction between the light and the NLM. In particular, the thermal lens effectively assists the nonlinear focusing phenomenon in generating a low-threshold fs SCG.

The disclosed method includes selecting the desired NLM from a group of transparent materials, which have a positive value of thermo-optic coefficient, i.e., temperature derivative of refractive index or $dn/dT>0\ K^{-1}$, and a wavelength at which a train of fs pulses is coupled into the selected NLM. The fs pulse train is outputted by a fs oscillator operating at full PRR ranging between 10 MHz and 10 GHz and when coupled into the NLM do not have a sufficient energy to reach a threshold of fs SCG, because the self-focusing in the NLM is too weak.

Then an additional wavelength or wavelengths, which is obtained by either coupling into the NLM of an auxiliary laser source, or as a result of nonlinear effects due to the interaction between the fs pulses and the NLM, is absorbed by the NLM. The absorption is accompanied by heat dissipation along the fs beam cross-section which leads to the formation of the thermal lens. The addition of the thermal lens assists nonlinear self-focusing and, hence, results in a filament formation at reduced peak power of fs pulses.

The selected NLM may or may not be a gain medium. In other words, the selected NLM does not have to be an optical amplifier. The developed criterion for the suitable NLM requires that it be at least partially transparent at the wavelength of the coupled fs pulse train and have a positive thermo-optic coefficient. The selected NLM can be found in publicly accessible sources well-known to one of ordinary skill or determined experimentally.

In accordance with one feature of the disclosed method, the selected NLM is characterized by high second- and third-order nonlinearity ($\chi^{(2)}\neq 0$ and $\chi^{(3)}\neq 0$ respectively). As a result of such nonlinear effects as three-wave mixing, optical parametric generation, optical rectification and multiphoton absorption additional wavelengths are generated in the NLM. At least one of these new wavelengths is absorbed in the selected NLM which leads to the formation of the thermal lens. Another nonlinear effect causing generation of additional wavelengths may include four wave mixing which, similar to the Kerr effect, arises from third-order nonlinearity ($\chi^{(3)}\neq 0$). In addition to the newly generated wavelength, those spectral components which are located beyond the transparency window of the selected material are also absorbed contributing to the formation of the thermal lens.

In accordance with another feature, in addition to fs pulses, a continuous wavelength (CW) beam is coupled into the selected NLM. The wavelength of the CW beam is selected to be absorbed in the NLM causing the heat dissipation and formation of the thermal lens which in combination with the nonlinear focusing is instrumental in reaching a low threshold of SCG.

In accordance with another feature of the disclosed method, the selection of non-linear material is based on the wavelength of the fs oscillator used in the given schematic. Conversely, if the non-linear material and its optical characteristics are known, the fs oscillator is selected to operate at a wavelength which interacts with the known material to provide both the nonlinear focusing and some other nonlinear effect responsible for an additional wavelength known to be absorbed in the NLM to provide a thermal lens. Many material characteristics including the absorption spectrum are well documented.

Another feature of the disclosed method includes determining the formation of the thermal lens. In particular, the spectra of input fs pulses is repeatedly measured at the input and output of the selected nonlinear material. The greatest output spectral bandwidth, which significantly exceeds the input spectral bandwidth, indicates the formation of the sufficiently strong thermal lens and indicates that the threshold of the fs SCG has been reached.

Still another feature of the disclosed method relates to optimization of the fs SCG necessary to achieve the broadest spectrum of the fs pulses at the output of the selected material after the threshold has been reached. The optimization includes controllably changing the initial size of the input beam spot and/or an average power of the coupled fs pulses and/or average power of the auxiliary laser source, and/or pre-chirping the input fs pulses.

Alternatively or in combination with selective or all of the above-mentioned optimization techniques, the disclosed method may include determining a location of the self-focusing point inside the selected materials and identifying a temporal distribution of the coupled fs pulses at this location. Preferably, if the fs pulses are pre-chirped, in accordance with still another method feature, the optimization includes selecting the material characterized by dispersion which is instrumental in compressing the pre-chirped pulses. The most efficient optimization occurs by compressing the pre-chirped pulsed to the shortest possible fs pulses at the location of nonlinear self-focusing.

The other aspect of the disclosure relates to an optical schematic configured to carry out the disclosed method which may include any of the above-discussed and other features or a combination of these features. Accordingly, the inventive schematic can include any one disclosed feature or a combination of selective or all disclosed features.

In accordance with this aspect, the disclosed schematic may include the fs oscillator and an optical pump having respective output beams to be superimposed within the selected nonlinear material. The optical pump facilitates the formation of the thermal lens. Still another schematic does not require additional optical sources and is configured only with the fs oscillator and selected NLM. In accordance with the inventive concept, the parameters of the fs oscillator and the NLM are selected such that NLM partially absorbs the fs laser radiation imposing a thermal waveguide and forming the thermal lens which assist the nonlinear focusing in generating a low threshold CG.

BRIEF DESCRIPTION OF THE DRAWINGS

The above and other features of the disclosed aspects will become more readily apparent from the following drawings, in which:

FIG. 1A illustrates a standard setup for bulk fs-SCG characterized by filamentation and strong nonlinear broadening at $P_{Pk}>>P_{Crit}$, wherein Ppk—peak power and Pcrt—critical power.

FIG. 1B the standard setup for bulk fs-SCG characterized by the absence of filamentation and weak nonlinear broadening at $P_{Pk}\leq P_{Crit}$.

FIG. 2 illustrates a simulated spectral bandwidth of low-threshold SCG as a function of the laser gain (g) and the refractive index change imposed by the disclosed thermal lens.

FIG. 3A is an exemplary schematic configured to carry out the inventive method.

FIG. 3B is another exemplary schematic configured to carry out the inventive method.

FIG. 4A illustrates the experimentally measured SCG vs the simulation-predicted spectra with and without the disclosed thermal effect.

FIG. 4B illustrates the simulated transverse fluence profile of the nJ pulse in accordance with the known art.

FIG. 4C illustrates the transverse distribution a thermal guide of the nJ pulse in accordance with the disclosure.

FIG. 5A illustrates the measured spectra of fs pulses at the input and output, which correspond to respective blue and red curves, of the selected NLM of FIG. 3A at a relatively low average and peak power: wherein the output spectra includes the fundamental band (f).

FIG. 5B illustrates the measured spectra offs pulses at the input and output of the NLM of FIG. 3A at average and peak power which is greater than those of FIG. 5A, wherein the output band includes the fundamental band (f) and the long-wave IR band (Of) generated in the NLM via optical rectification.

FIG. 5C illustrates the measured spectra of fs pulses at the input and output of the NLM of FIG. 3A at the average and peak powers, which are higher than those of FIG. 5B, wherein the output spectra includes the intermediate band which is generated in the NLM via a chain of three-wave mixing between the spectral components from the f- and Of-bands.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 1A illustrates a standard setup for bulk fs-SCG characterized by filamentation and strong nonlinear broadening at $P_{Pk}>>P_{Crit}$, wherein Ppk—peak power and Pcrt—critical power.

FIG. 1B the standard setup for bulk fs-SCG characterized by the absence of filamentation and weak nonlinear broadening at $P_{Pk}\leq P_{Crit}$.

FIG. 2 illustrates a simulated spectral bandwidth of low-threshold SCG as a function of the laser gain (g) and the refractive index change imposed by the disclosed thermal lens.

FIG. 3A is an exemplary schematic configured to carry out the inventive method.

FIG. 3B is another exemplary schematic configured to carry out the inventive method.

FIG. 4A illustrates the experimentally measured SCG vs the simulation-predicted spectra with and without the disclosed thermal effect.

FIG. 4B illustrates the simulated transverse fluence profile of the nJ pulse in accordance with the known art.

FIG. 4C illustrates the transverse distribution a thermal guide of the nJ pulse in accordance with the disclosure.

FIG. 5A illustrates the measured spectra of fs pulses at the input and output, which correspond to respective blue and red curves, of the selected NLM of FIG. 3A at a relatively low average and peak power; wherein the output spectra includes the fundamental band (f).

FIG. 5B illustrates the measured spectra of fs pulses at the input and output of the NLM of FIG. 3A at average and peak power which is greater than those of FIG. 5A, wherein the output band includes the fundamental band (f) and the long-wave IR band (Of) generated in the NLM via optical rectification.

FIG. 5C illustrates the measured spectra of fs pulses at the input and output of the NLM of FIG. 3A at the average and peak powers, which are higher than those of FIG. 513, wherein the output spectra includes the intermediate band which is generated in the NLM via a chain of three-wave mixing between the spectral components from the f- and Of bands.

SPECIFIC DESCRIPTION

The inventive subject matter relates to an additional optical mechanism which together with nonlinear focusing of fs pulses allow to reach a threshold of fs SCG that would be unattainable if only the nonlinear focusing were used. Inadequate nonlinear focusing occurs due to low pulse energy and, hence, peak power which is insufficient to generate strong nonlinear effects leading to the fs SCG. In particular, fs laser oscillators, typically operating at high PRR, output fs pulses with a pulse energy and peak power insufficient to reach the SCG threshold in BNLM receiving these pulses. The solution to this problem, as disclosed here, is to create a thermal lens in the BNLM which, in combination with the nonlinear lens, leads to the fs SCG. The thermal lens provides additional focusing of insufficiently nonlinearly focused fs pulses along the length of BNLM and assists the nonlinear focusing in reaching the threshold of fs SCG at full PRR of the fs oscillator ranging between 10 MHz and 10 GHz. The SCG threshold reached in accordance with the inventive concept tends to lower the SCG threshold reachable only by the nonlinear focusing at least by a factor of two.

FIG. 2 illustrates the importance of the thermal lens for generating fs SCG in BNLM (labeled NLM). In particular, FIG. 2 illustrates a simulated spectral bandwidth of low-threshold SCG ($\Delta\upsilon$ (THz)) as a function of the gain (G) and a refractive index change $\Delta n$ imposed by the thermal lens. Red, purple and green arrows indicate respective qualitative trajectories of increasing pump power and its impact on maximum achievable value of gain and $\Delta n$ at low, medium and high level of the pump laser absorption in NLM, respectively. The broadening of the output spectrum is somewhat insignificant with the gain increase, which indicates that the laser gain alone (i.e. an increase of pulse energy and peak power by approximately a factor of 4) is not sufficient for reaching the fs SCG threshold (i.e. achieving strong spectral broadening). Although, to an extent, the gain contributes the spectral broadening. In contrast, the refractive index change $\Delta n$ (green arrow), which creates a thermal lens in the medium, is instrumental in the broadening of the output spectrum and, hence, reaching the fs SCG threshold. In conclusion, the comparison of blue and red curves clearly demonstrates that it is the waveguide formed due to thermal lensing that largely enables the desired low-threshold SCG. Also FIG. 2 demonstrates that a selected BNLM does not have to be necessarily a laser gain medium in order to reach the f SCG threshold: the thermal lens alone (i.e. an increase of $\Delta n$ at the constant G=1) could be sufficient.

To overcome the insufficient pulse energy and peak power and, hence, pulse energy limitations of conventional fs-SCG in BNLMs, the disclosure teaches how to create a thermal self-focusing mechanism (also known as thermal lens) based on the temperature-dependence of the refractive index n(T). The thermal lens assists conventional nonlinear self-focusing which arises from the intensity-dependence of the refractive index $n(I)=n_0+n_2I$ (Eq. 1). The formation of the thermal lens is better explained below.

Numerous BNLMs are characterized by a positive value of temperature derivative of refractive index $dn/dT>0\ K^{-1}$. As also known by one of ordinary skill, heat dissipation at the axis of the laser beam propagating through the absorbing medium induces a temperature distribution T(r) across the beam section, which can be approximated by $$\frac{d^2T(r)}{dr^2}+\frac{1}{r}\frac{dT}{dr}+\frac{P_h}{\kappa V}=0, \qquad \text{Eq. (2)}$$

where $P_h$ is the heat power dissipated in the medium, $\kappa$ is the medium thermal conductivity, and V is the volume of the heat dissipating region, and r is the radial distance of the heat dissipation from the beam axis. Therefore, heat dissipation creates a local temperature increase $\Delta T$, which, in turn, induces a local change of the refractive index $$\Delta n=\frac{dn}{dT}\Delta T. \qquad \text{Eq. (3)}$$

Therefore, the medium with heat dissipation at the axis of the laser beam acts like a temperature-dependent lens also known as a thermal lens. Under the influence of the thermal lens, the beam propagation in BNLMs can be considered by analogy with light propagation in a waveguide, as long as $\Delta n$ is a fraction of the refractive index n. Therefore, the disclosed fs-SCG method combines, to some extent, the advantages of bulk and confined geometries. Similar to the waveguide-based setups, it allows for the generation of super-octave coherent spectra at nJ-level pulse energies and high repetition rates. At the same time, the spatial-and-temporal dynamic is akin to those in bulk media and characterized by including additional focusing, ionization etc, is central to the favorable properties of the proposed fs-SCG scheme.

The foregoing provides a roadmap to the generation of fs SCG in BNLM in accordance with the inventive concept. Due to a wide selection of BNLMs characterized by the third order nonlinearity, the non-linear focusing is based on the Kerr self-focusing effect manifested by the formation of the nonlinear lens. Based on the specifics discussed above, the non-linear lens alone is not sufficient to increase intensity of fs pulses to the level sufficient for the formation of broad output spectrum (i.e. the fs SCG threshold is not reached). To increase the intensity of fs pulses, the thermal focusing effect is created to assist the nonlinear focusing. It can be created by absorbing light at the wavelength of fs pulses or at any other suitable wavelength that is absorbed in the BNLM via any linear and/or nonlinear absorption mechanism and, hence, creates the thermal lens in the medium in accordance with Eq. 1 in the selected BLNM. The linear absorption in bulk dielectrics and semiconductors is well known effect. The wavelengths that correspond to linear absorption in a specific medium can be found in the available literature or measured using the available equipment. The nonlinear absorption can be achieved by utilizing such nonlinear processes as (1) multi-photon absorption typical for practically a great variety of BNLMs, (2) three-wave mixing and (3) four-wave mixing generating new wavelength(s) different from the fundamental wavelength of fs pulses, but absorbable by the selected BNLM. As such, the methodology described here includes the selection of linear and absorption refractive coefficients (Ex 1) of BNLM and the operating wavelength of fs oscillators. For the three-wave mixing, the selected BNLM, in addition to the 3 order of nonlinearity ($\chi^{(3)}\neq 0$), should have the second order of nonlinearity ($\chi^{(2)}\neq 0$). The heat generated due to the absorption dissipates across the pump beam creating a refractive index gradient across the pump beam $\Delta n=(dn/dT)\Delta T$ which is roughly proportional to the absorbed power. Under these conditions, the region along the axis of the laser beam has the refractive index higher than that at the beam's periphery which forms the thermal lens. In the end, both dominant non-linear and thermal lenses cooperate with one another to reach the filament formation threshold leading to fs SCG.

FIGS. 3A and 3B illustrate respective exemplary optical schematics configured to realize the inventive concept. Each of the illustrated schematics includes a fs laser or oscillator outputting a train of fs nJ pulses, which have a relatively narrow input spectrum, at a full PRR which ranges between 10 MHz and 10 GHz. The upstream lens L or equivalent optical component (e.g. concave mirror) focuses the fs light into the body of BNLM labeled NLM. The pulse peak power of nJ fs pulses varies in a sub-MW to 10 MW range which is lower than the critical power (i.e. $P_{Pk}\leq P_{Crit}$). Therefore, the known pulse peak power is sufficient to create only a weak nonlinear lens. Therefore, the fs SCG threshold in the selected BNLM is not reached. The downstream lens L collimates light at the output of the NLM.

Referring specifically to FIG. 3A, the optical schematic further includes a second laser source or a pump which can operate in CW or pulsed regimes to output light at a second wavelength different from that of fs pulses. Femtosecond and CW radiations are superimposed on a dichroic mirror (DM) and focused in a BNLM by respective upstream lenses L or equivalent optical component (e.g. concave mirrors). The optimization of the fs SCG here may be realized by controlling the power of the pump and/or the beam size of both lasers along with other methods discussed below. These parameters can be controlled by incorporating an optical arrangement OA including one or more lenses. The power of the pump can be controlled by a number of methods well known in the art (a vast majority of lases sources have controllable power.

For example, the second wavelength is selected to pump be absorbed in the BNLM. The optical characteristics of the used here BNLMs including the absorption spectrum are well documented. Typically, the pump outputs the second wavelength in a 1.5-2 μm, but this range is not exclusive due to a great variety of BNLMs and can be somewhat, not extensively, shifted in opposite spectral directions. Technically, the second wavelength can be coupled into the BNLM to propagate with the first wavelength in the same or opposite direction.

Other nonlinear processes can be used to generate new additional wavelengths different from the fs and second operating wavelengths of respective laser sources. Those new wavelengths, not the first and second wavelengths, can be absorbed in the BNLM and, thus, contribute to the formation of the thermal lens. The generation of new wavelengths in specifically selected BNLM with the 2 order of nonlinearity (and, of course, 3 order as well) is generally referred to as three-wave mixing, but it includes various processes disclosed below.

One process of the 3-wave mixing includes second harmonic generation (SHG) of the fundamental frequency of the fs beam, which itself is not absorbable in the NLM, but its second harmonic is. The absorption causes heat dissipation and eventual filamentation leading to the generation of fs SCG and spectral broadening of the output fs pulses.

Still another process is known as either sum- or difference-frequency generation. In both of these types of frequency conversion, the wavelengths of respective fs and pump lasers, neither of which is absorbable, interact with one another and BNLM to generate a third wavelength within the absorption spectrum of the selected BNLM.

Another type of three-wave mixing is optical rectification. This effect is somewhat similar to difference frequency generation because the interaction between the fs laser and BNLM generates new wavelengths longer than the first wavelength of the fs laser and absorbable in the BNLM.

Yet another process of three-wave mixing is parametric generation in which the pump wavelength is selected to interact with the BNLM to generate new wavelengths, which are longer than the initial wavelength of the fs laser and at least one of which is absorbable to create a thermal lens. One of these new wavelength is absorbable in the selected BNLM to participate in formation of the thermal lens.

As mentioned above, the BNLMs with third order nonlinearity that also are characterized by the second order are quite numerous. In general, these materials may be selected from single crystal and polycrystalline materials with third nonlinearity ($\chi^{(3)}\neq 0$) which includes a sub-group of BDLMs with the second ($\chi^{(2)}\neq 0$) nonlinearity. The, single crystal materials include oxides (BBO) phosphides (ZGP), and others. Also, quasi or random quasi-phase-matched materials selected from one of PPLN, PPSLT, OP-GaAs, OP-GaP, polycrystalline ZnS and polycrystalline ZnSe.

FIGS. 4A-4C illustrate experimentally measured SCG an nJ-level pulse energy vs the simulation-predicted spectra with or without thermal effects in the schematic of FIG. 3A. FIG. 4B illustrates the transverse fluence profile of the pulse without inclusion of any thermal effects (corresponds to the blue line in FIG. 4A). FIG. 4B shows the fluence distribution with a weakly-focusing thermal waveguide which corresponds to the red line in FIG. 4A. The white lines indicate the 1/e2 beam waist, of which the initial value is 85 μm.

FIGS. 4A-4C show that the absence and the presence of the thermal waveguide in the medium leads to a completely different intensity profiles along the propagation direction. In the absence of the thermal waveguide (FIG. 4B) fs pulses with nJ-level energy (i) propagate more-or-less like a Gaussian beam, i.e. with a very low nonlinear self-focusing due to the optical Kerr effect; (ii) the pulses' spectrum experiences very small amount of spectral broadening (also due to the optical Kerr effect). In contrast. FIG. 4C shows the presence of the thermal waveguide resulting in a thermal lens formation and its contribution to the nonlinear lens inside the NLM. This, in turn, results in a dramatic increase of the laser intensity inside the NLM, which is followed by an explosive increase of the spectral bandwidth, i.e. in a generation of supercontinuum at nJ-level energy of input pulses (low-threshold SCG).

FIG. 3B illustrates a schematic including a single fs oscillator (laser) and bulk nonlinear medium (NLM). The parameters of the fs laser and of the NLM are selected such that NLM partially absorbs the fs laser radiation via some linear of nonlinear mechanism. This, in turn, imposes in the NLM a thermal waveguide with a refractive index change at the axis of the pump beam $\Delta n=(dn/dT)\Delta T$, as described above. The inventors term this schematic as self-thermal-waveguiding. Practically all of the nonlinear processes disclosed in reference to FIG. 3A are at work in the self-thermal waveguiding of FIG. 3B, with the BNLM is configured to support both three-wave and four-wave processes such as four wave mixing multi photon absorption and, of course, Kerr nonlinear focusing processes which are particularly important for the selected BNLM. In contrast to FIG. 3, only the first fs wavelength generates all of the above-mentioned nonlinear processes resulting in generating new absorbable wavelengths.

The experimental implementation of low threshold fs-SCG with self-thermal waveguiding schematic of FIG. 3B is illustrated in FIGS. 5A-C. Here, the experiments were carried out with a mode-locked Cr:ZnS fs laser at the PRR (frequency) $f_R$=81 MHz and ZGP crystal as the BNLM. The 3-mm long ZGP (zinc germanium phosphate) crystal with high second order nonlinearity ($\chi^{(2)}\neq 0$) was configured for optical rectification of input fs pulses.

The ZGP crystal absorbs some spectral components, which are created due to the nonlinear frequency conversion of input pulses. Specifically, it absorbs the SH of input pulses at 1.2 μm and the long-wave IR components of output pulses at the wavelengths above 12 μm. Those nonlinear absorptions create a thermal waveguide in the ZGP medium. The confinement of the fs radiation in the thermal waveguide results in the increased laser intensity. Increased laser intensity, in turn, causes the increased nonlinear absorption and, continuously stronger thermal waveguiding and stronger confinement of the fs radiation leading to the filamentation and, finally, SCG. In addition to the ZGP, BNLM may include fluorides (CaF2) or sulfides and selenides (ZnS, ZnSe, GaSe) and TM:II-VI semiconductors which can be single crystal and polycrystalline Cr:ZnS, Cr:ZnSe, Fe:ZnS, Fe:ZnSe with high third order nonlinearity ($\chi^{(3)}\neq 0$).

In particular, FIGS. 5A-5C illustrate the measured spectra of fs pulses at the input (in blue curves) and at the output (out red curves) of the NLM. The spectra is measured during the gradual increase of the average power of the pulse train and pulse energy. The output spectra consist of the fundamental band (f), the long-wave IR band (Of) which is generated in the NLM via optical rectification and the intermediate band that is generated in the NLM via a chain of three-wave mixings between the spectral components from f-band and Of-band as shown in FIG. 5C.

FIG. 5A corresponds to 14 nJ energy (1.1 W average power) of input pulses at fundamental frequency f. As can be seen, in this regime the nonlinear broadening of output pulses is very low. One can consider 1.6.7% losses in the NLM as linear losses due to, e.g., linear absorption, imperfect coatings of the sample, etc. FIG. 5B corresponds to 32 nJ causing the nonlinear broadening which is somewhat broader than that of FIG. 5A. The 19.8% losses indicate linear and nonlinear losses with the latter being because of nonlinear focusing. FIG. 5C corresponds to 46 nJ energy (3.8 W average power) of input pulses. In this regime the nonlinear broadening of output pulses is very strong and pulses propagate with losses of 23.5% including linear and nonlinear losses that corresponds to additional 0.3 W heat dissipation in the NLM. Based on the foregoing, a reliable indication that the filamentation threshold has been reached is the thermal lens created due to the additional nonlinear absorption in the BNLM. Thus, an increase of input pulse energy by a factor of 3.3 results in a dramatic enhancement of spectral broadening and in a low-threshold fs-SCG which is simultaneously governed by nonlinear and thermal optical effects in the BNLM.

The low low-threshold SCG obtained in accordance with this disclosure can be further improved by (i) 'right' pre-chirping and pre-shaping of input pulses from the fs laser, (ii) additional laser gain (G) in the NLM, and (iii) optimization of the parameters of the thermal waveguide (i.e. optimization of a refractive index change of Δn at the axis of the pump beam. The improvement (i) can be accomplished by utilizing undoped YAG plates, ZnSe plates, mirrors with chromatic dispersion, volume Bragg gratings (VBG) and others selectively inserted between the fs oscillator and BNLM. All of these components can be part of the optical arrangement OA as shown in FIG. 3A and are equally usable in the schematic of FIG. 3B. Of course, the dispersion characteristics of the BLNM should be selected to cancel the pre-chirp and compress fs pulses to the shortest possible duration inside the BLNM. The improvement (ii) include the utilization of BNML which is simultaneously laser and nonlinear material. Additional laser gain G results in additional increase of the intensity inside the NLM and hence in a low-threshold SCG with a broader output spectrum, as shown in FIG. 4B. The improvement (iii) includes fine-tuning the pump laser absorption inside the NLM and results in a low-threshold SCG with even broader output spectrum. The importance of the fine tuning of Δn on the parameters of low-threshold SCG is illustrated in FIG. 4C in which the shortest fs pulses are obtained at the location of the focus of the thermal guide in the NLM. The disclosed optimization can be realized experimentally or by computer stimulation.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method of controlling femtosecond supercontinuum (fs SCG) in a bulk nonlinear material (BNLM) with a positive thermo-optic coefficient (dn/dT>0 $K^{-1}$), comprising:

coupling light, which is emitted by a fs pulse oscillator at a first wavelength, into the BNLM, thereby producing nonlinear focusing of the coupled fs pulses in the BNLM, wherein the fs oscillator operates at a full repetition rate;

providing interaction between the BNLM and light at a second wavelength different from the first wavelength and absorbable by the BNLM, thereby forming a thermal lens in the BNLM, wherein the nonlinear focusing of the fs pulses and thermal lens cumulatively generate the fs supercontinuum at the full repetition rate of the fs oscillator.

2. The method of claim 1, wherein the BNLM is selected to have linear absorption, nonlinear absorption or linear and nonlinear absorption at the first and second wavelengths, the first wavelength length being selected from the near-IR to the MID-IR spectral range extending between 1 and 10 μm.

3. The method of claim 2, wherein the interaction between the BNLM and first wavelength includes partially converting the first wavelength into at least one or more additional wavelengths upon multi-photon absorption or nonlinear three-wave or four-wave mixing or a combination thereof of the first wavelength.

4. The method of claim 1, wherein the BNLM is selected from amorphous, single crystal and polycrystalline materials, with third order nonlinearity ($\chi^{(3)}\neq 0$) and, optionally, second order nonlinearity ($\chi^{(2)}\neq 0$), the single crystal materials being a YAG, BBQ, ZGP, $CaF_2$, ZnS, ZnSe, or GaSe, and the amorphous materials including silicate or non-silicate glasses.

5. The method of claim 4, wherein the BNLM is selected from a quasi-phase-matched or random quasi-phase-matched single crystal or polycrystalline materials with the second order nonlinearity ($\chi^{(2)}\neq 0$) which enables one of sum frequency mixing, difference frequency mixing, optical parametric generation or optical rectification or a combination thereof, and is selected from PPLN, PPSLT, PPKTP, OP-GaAs, OP-GaP, polycrystalline ZnS, and polycrystalline ZnSe.

6. The method of claim 4, wherein the BNLM is selected from TM:II-VI semiconductors including single crystal and polycrystalline Cr:ZnS, Cr:ZaSe, Fe:ZnS, Fe:ZnSe.

7. The method of claim 1, wherein the absorption of the second wavelength induces radial temperature distribution along a cross-section of light acting as a thermal guide, thereby forming the thermal lens.

8. The method of claim 1, wherein the interaction between the BNLM, first wavelength and second wavelength includes partially converting the first and second wavelengths into at least one or more additional wavelengths upon nonlinear three-wave and four-wave mixing of the first and second wavelengths, the first and second wavelengths co-propagating or counter propagating in the BNLM.

9. The method of claim 1 further comprising optimizing the SCG, thereby achieving a broadest spectrum of the fs pulses at an output of the BNLM at a possibly lowest energy and peak power of the fs pulses at an input of the BNLM, wherein the optimization of the SCO includes:

(a) adjusting a beam size of the light at the first wavelength incident on the BNLM, (b) adjusting an average power and a beam size of the light at the second wavelength, (c) identifying an optimal temporal distribution of the fs pulses at a location of self-focusing upon inserting an optical element which is selected from bulk optical materials (YAG, ZnSe), or a combination of VBG and dispersive mirrors, thereby positively or negatively pre-chirping the fs pulses upstream from the BNLM, (d) selecting the BNLM to have material dispersion, thereby compressing the pre-chirped fs pulses, or (e) identifying a location of the self-focusing of the pre-chirped fs pulses inside the BNLM and compressing the pre-chirped pulses to a shortest possible pulse duration within the identified location, or (f) a selective combination of (a) through (e).

10. The method of claim 1, wherein the BNLM is configured as a gain medium or non-gain medium at the first wavelength.

11. The method of claim 1, wherein a threshold of the self-focusing in the presence of the thermal lens is lower than the threshold in the absence of the thermal lens by at least a factor of two (2).

12. An optical schematic for controlling femtosecond supercontinuum generation (fs SCG), comprising:

a fs oscillator outputting light having a train of fs pulses at a full PRR, which ranges between 10 MHz to 10 GHz, at a first wavelength; and a bulk nonlinear material (BNLM) receiving the fs pulses with a pulse energy inducing local nonlinear focusing which is insufficient for reaching a threshold of the fs SCG, the BNLM having a positive thermo-optic coefficient ($dn/dT>0\ K^{-1}$) and configured to absorb light at a second wavelength, which is different from the first wavelength, the absorbed light inducing heat dissipation through a cross-section of the first wavelength which forms a thermal lens along a length of the BNLM, wherein the thermal lens increases the intensity of the nonlinear focused fs pulses at the first wavelength to the threshold of the fs SCG.

13. The optical schematic of claim 12, wherein the BNLM is selected to have linear absorption, nonlinear absorption or linear and nonlinear absorption at the first and additional wavelengths, the first wavelength length being selected from the near-IR to the MID-IR spectral range extending between several hundred nanometers (nm) and 10 μm.

14. The optical schematic of claim 12, wherein the BNLM is selected from amorphous, single crystal and polycrystalline materials, with the third order nonlinearity ($\chi^{(3)}\neq0$), the selected BNLMs with the third order nonlinearity include a subgroup of BNLM with the second order nonlinearity ($\chi^{(2)}\neq0$).

15. The optical schematic of claim 14, wherein the BNLMs of the subgroup with the second order nonlinearity each are selected from single crystal or polycrystalline materials which include birefringent phase matched, quasi-phase-matched or random quasi-phase-matched materials, wherein the birefringent phase matched materials being one of LN, LBO, BBQ, KTP, ZGP, GaSe, the quasi-matched materials being one of PPLN, PPSLT, PPKTP, OP-GaAs, OP-GaP, and the random quasi-matched materials being one of polycrystalline ZnS or polycrystalline ZnSe.

16. The optical schematic of claim 15, wherein the BNLM materials each are configured for three-wave mixing (TWM) including a nonlinear process which is selected from one or combination of second harmonic generation (SHG), sum- and difference-frequency generation, optical rectification and parametric generation.

17. The optical schematic of claim 14, wherein the amorphous materials include silicate and non-silicate glasses, and single crystal materials include oxides (YAG, BBO) phosphides (ZGP), fluorides (CaF2) or sulfides and selenides (ZnS, ZnSe, GaSe), and the BNLM is selected from TM:II-VI semiconductors including single crystal and polycrystalline Cr:ZnS, Cr:ZnSe, Fe:ZnS, Fe:ZnSe which are configured for laser interactions, three-wave mixing, four-way mixing of the first and additional wavelengths to produce the second wavelength and multi-photon absorption.

18. The optical schematic of claim 17 further comprising an auxiliary laser source outputting an additional wavelength coupled into the BNLM so that the additional and first wavelengths co-propagate or counter-propagate, the additional wavelength being the second wavelength absorbed in the BNLM, or pumping the first wavelength or nonlinearly interacting with the BNLM and first wavelength to provide the three-wave mixing resulting in generation of the second wavelength, wherein the auxiliary laser source operates in a continuous wave or pulsed regimes.

19. The optical schematic of claim 18 further comprising a lens arrangement located between the auxiliary laser source and the BLNM and configured to controllably change a beam size of light at the additional wavelength, wherein the auxiliary laser source is configured to controllably adjust an average power of light at the additional wavelength or the fs oscillator and the BNLM and configured to change a beam size of the light at the first wavelength.

20. The optical schematic of claim 12 further comprising a dispersive element located between the fs oscillator and BNLM and including one or more of undoped YAG plates, ZnSe plates, mirrors with chromatic dispersion, volume Bragg gratings (VBG) to apply a chirp to the fs pulses, the BNLM being configured with material dispersive characteristics to compress the pre-chirped fs pulses, a beam size of the first and second wavelengths and the power of the second wavelength being controlled so that the nonlinear focusing and thermal lens have a common focal location within the BNLM.

* * * * *